Figure 1:
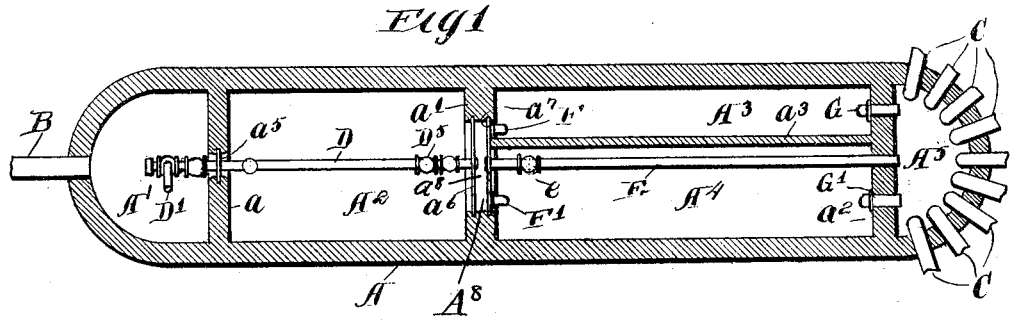

No. 770,490. PATENTED SEPT. 20, 1904.
J. W. ALVORD.
PROCESS OF PURIFYING SEWAGE.
APPLICATION FILED JULY 13, 1901.
NO MODEL. 3 SHEETS—SHEET 1.

Witnesses:
Carl M. Crawford
William H. Hall

Inventor:
John W. Alvord
by Poole & Brown
his Attorneys

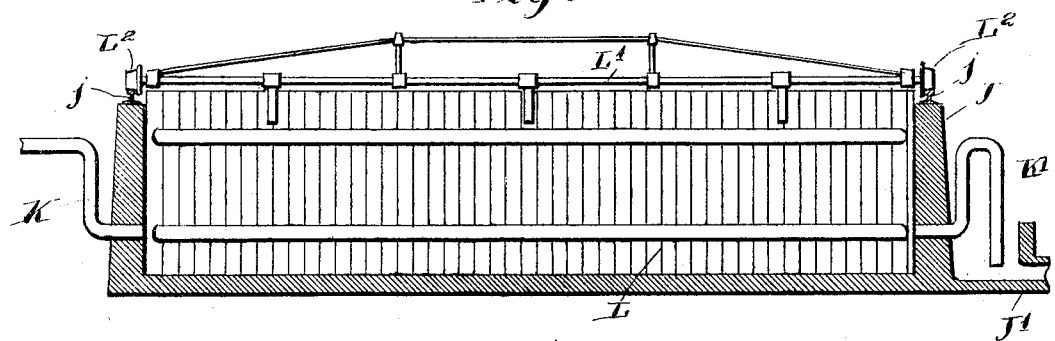
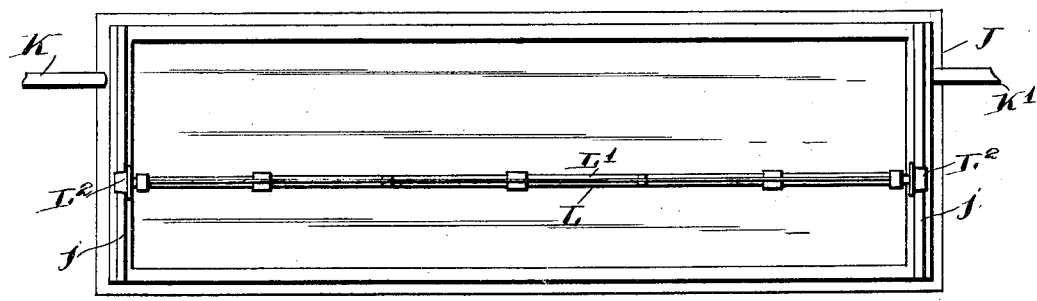
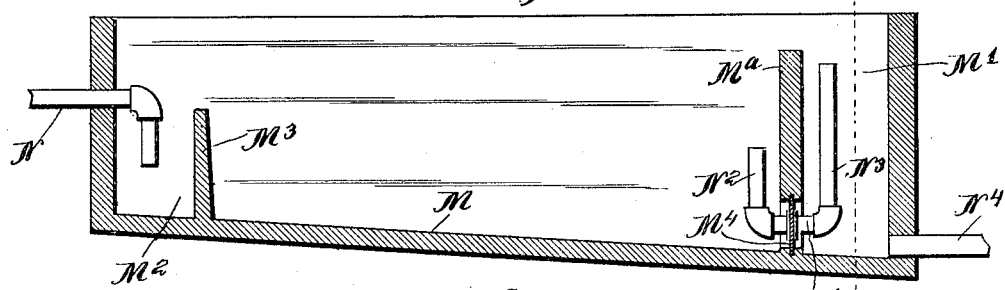
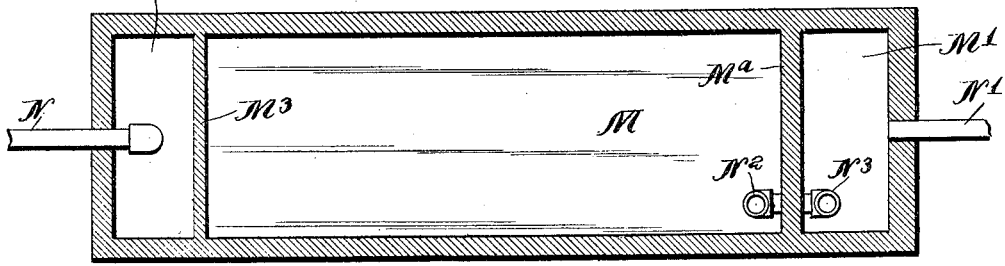

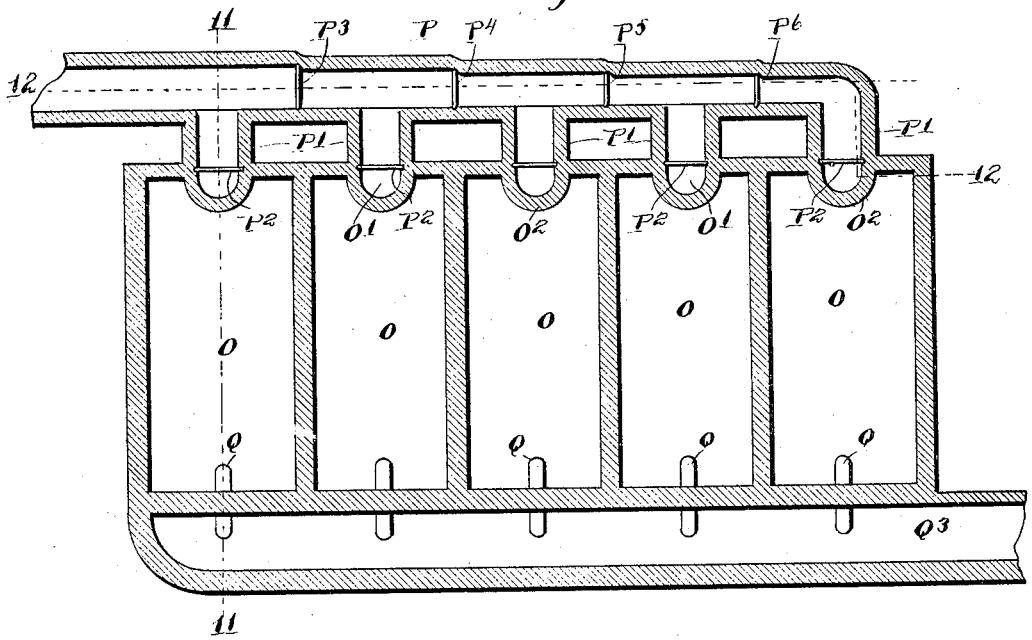

No. 770,490. Patented September 20, 1904.

UNITED STATES PATENT OFFICE.

JOHN W. ALVORD, OF CHICAGO, ILLINOIS.

PROCESS OF PURIFYING SEWAGE.

SPECIFICATION forming part of Letters Patent No. 770,490, dated September 20, 1904.

Application filed July 13, 1901. Serial No. 68,153. (No model.)

*To all whom it may concern:*

Be it known that I, JOHN W. ALVORD, of Chicago, in the county of Cook and State of Illinois, have invented certain new and useful Improvements in Processes of Purifying Sewage; and I do hereby declare that the following is a full, clear, and exact description thereof, reference being had to the accompanying drawings, and to the letters of reference marked thereon, which form a part of this specification.

This invention relates to a novel process of purifying sewage by septic action, wherein the raw sewage, with or without previous treatment, is slowly passed through a tank or tanks of relatively large area in which such conditions or environments are established and maintained as to develop enormous numbers of bacteria known as "anaërobic" bacteria, or bacteria which thrive without free oxygen, said bacteria, in a manner not at present well understood, acting upon the solid matter held in suspension in the sewage and reducing the same to a gaseous or liquid form, whereby the effluent discharged from the tank consists of a relatively clear and inoffensive liquid. This effluent may be diverted at once to natural waterways or may be further purified by being subjected to a secondary treatment, which consists in passing the effluent over or through contact-beds consisting of coke-breeze or similar substances. The effluent on its way from the septic-tank to the contact-beds is passed over aerating-weirs, so as to develop therein aërobic bacteria, which latter are supposed to act upon the sewage in the contact-beds in a manner to further purify the sewage.

The process constituting this invention relates to the treatment of the sewage in the septic-tank; and the object of the invention is to provide an improved process for the treatment of sewage in the primary or anaërobic stage thereof which will insure a practically uniform character of effluent, notwithstanding wide variations in the characteristics and the volume of the sewage treated and varied influencing environments.

I have discovered that every kind or class of sewage has its most effective rest period. By the term "rest period" is meant the time required for the presence of the sewage in the septic-tank in order that it be properly exposed to the action of the bacteria therein to produce a satisfactory effluent. For instance, it is found that a highly-concentrated sewage requires, in order to produce a satisfactory effluent, to be subjected or exposed to the bacterial action in the septic-tank for a longer period than a sewage which is considerably diluted, so that it is necessary in the treatment of concentrated sewage to lengthen the period of time in which the sewage is subjected to the anaërobic bacterial treatment beyond that required for the effective treatment of a diluted sewage. Furthermore, a high temperature accelerates the process of purification in the septic-tank and a low temperature retards it. During the summer time, therefore, a given kind or character of sewage requires a shorter rest period than during the colder or winter season. If the sewage remains in the septic-tank for a longer time than its proper rest period, the vitality and activity of the anaërobic bacteria are modified by the production of toxins, which if allowed to accumulate retard propagation and lessen the length of the active life of the bacteria. It is requisite, therefore, to the proper treatment of sewage by bacterial action that environments be established and maintained in the septic-tank which are favorable to the active and continued propagation of the bacteria and to the prolongation of life of existing organisms, for the reason that if conditions be set up which retard propagation and shorten the life of the bacteria (which occurs when the rest period is unduly prolonged) a state of decomposition in the sewage is set up which results in a deteriorated effluent. On the other hand, an insufficient rest period produces little or no change in the effluent, with the exception that said effluent is subject to rapid decomposition when exposed to the air. Moreover, variations in the volume of the sewage vary the flow through the receptacles in which the septic action takes place, and it is essential that these variations be counteracted by varying the capacity of the tank or tanks, so as to produce a uniform rest period for varying volumes of sewage.

My improved process consists, therefore, of passing the sewage to be treated through a receptacle or receptacles and varying the rate of flow through the same with respect to the characteristics or volume of the sewage and to thereby vary the period of time during which the sewage is subject to the septic action to correspond with the known or determined rest period required for the proper purification of different kinds or classes of sewage. Where the volume of sewage varies, the capacity of the receptacles is varied in approximate consonance therewith for each given kind or character of sewage.

In practicing my novel process the attendant will be able to determine by experimentation, either through physical or chemical examinations, the character of sewage passing through or received by a receptacle from the inflow and after a series of experiments will be able to determine the proper or effective rest period for each kind or class of sewage. Having thus determined the proper rest periods he will be enabled to vary the rate of flow in order to insure the passage of the sewage through the receptacle or receptacles in which it is subject to the septic action during periods of time corresponding to known or determined rest periods.

In carrying out my novel process I employ a tank or tanks provided at one end with an inlet through which the raw sewage is delivered thereto and at its other end with an outlet through which the purified effluent is discharged therefrom and provide means located between the inlet and outlet for increasing the effective capacity of the tank or receptacle, thereby varying the time in which the sewage is passed through the tank to correspond with the proper rest period of different classes or conditions of sewage. This may be accomplished in several different ways. For instance, I may construct a tank having a plurality of compartments of fixed capacities, which compartments are capable of being thrown into communication with each other in various combinations, whereby the effective capacity of the tank as a whole is increased or decreased—that is to say, the communications may be such that the inlet-compartment of the tank, or that which first receives the raw sewage as it is delivered to the tank, may be thrown into communication with all or a less number than all of the compartments, so that the sewage may pass through one compartment, all the compartments, or an intermediate number thereof, as desired. If, for instance, the sewage being treated is of a highly-concentrated nature, the inlet or receiving-compartment of the tank will be thrown into communication with all of the compartments thereof, so as to increase the effective capacity of the tank to the maximum and to lengthen the time in which the sewage passes through the tank. On the other hand, when the sewage is diluted, which may occur during times of freshet, when the sewers are flushed with water, one or a less number than all of the compartments of the tank may be utilized, thereby decreasing the time occupied in the passage of the sewage through the tank to correspond with the proper rest period of the diluted sewage. Another means for effecting the same result is to provide the tank with a longitudinal partition, which is movable across the tank in a direction transverse to the direction of flow of the sewage through the tank, whereby upon moving said partition laterally away from or toward the inlet and outlet the effective capacity of the tank may be varied and the time in which the sewage passes therethrough correspondingly varied to correspond with the proper rest period of the sewage. Still another means of effecting the same general result is to provide the tank with an outlet-pipe so constructed as to be elevated or depressed, and thereby elevate or depress the flow-line of the sewage and correspondingly increase or reducing of the effective capacity of the tank and the time required for the sewage to pass therethrough. Still a further means of effecting the same general result is to regulate the inflow of the sewage to the tank in a manner to increase or decrease the time required for the sewage to pass therethrough. This may be accomplished by providing the inlet of the tank with adjustable valves or weirs, which may be adjusted to vary the flow of the sewage into and through the tank, and thereby vary the rest period of the sewage in a manner to produce a satisfactory effluent.

In the drawings I have illustrated types of the various constructions above suggested.

Figure 2:
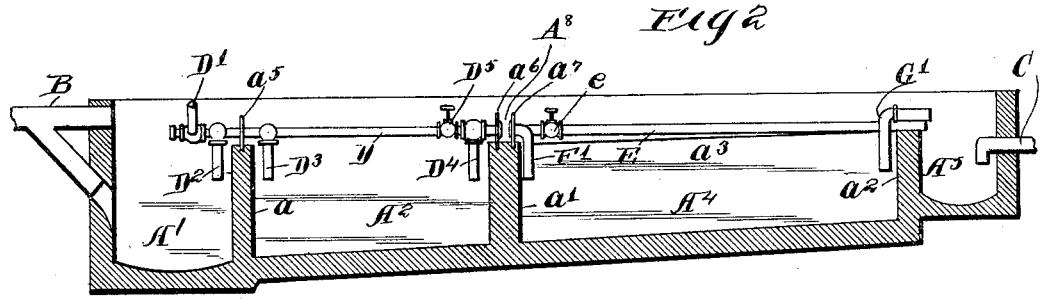
Figure 3:
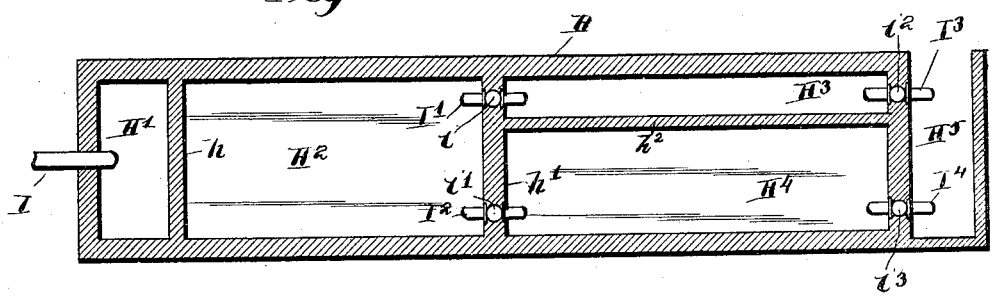
Figure 4:
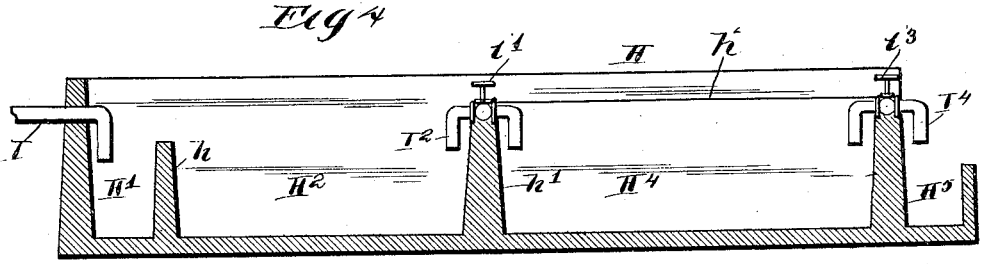

Figure 1 is a plan section of one type of tank for carrying out my novel process. Fig. 2 is a central vertical longitudinal section thereof. Fig. 3 is a horizontal section of another form of tank. Fig. 4 is a central longitudinal vertical section of the tank shown in Fig. 3. Fig. 5 is a central longitudinal vertical section of still another form of tank. Fig. 6 is a plan view of the tank shown in Fig. 5. Fig. 7 is a central longitudinal vertical section of a still further form of tank. Fig. 8 is a horizontal section thereof. Fig. 9 is a transverse view of the tank shown in Figs. 7 and 8 on line 9 9 of Fig. 7. Fig. 10 is a horizontal section of still another form of tank employed for carrying on my process. Fig. 11 is a transverse vertical section on line 11 11 of Fig. 10. Fig. 12 is a longitudinal vertical section on line 12 12 of Fig. 10.

First referring to the construction shown in Figs. 1 and 2, A designates an elongated tank having continuous outer end and side walls made preferably of masonry construction. Said tank is divided by transverse walls $a$ $a'$ $a^2$ and a longitudinal wall $a^3$ in separate compartments $A'$ $A^2$ $A^3$ $A^4$ $A^5$. The compartment $A'$ constitutes the detritus or grit compartment into which the raw sewage is discharged by the pipe B. The compartment $A^5$ constitutes a distributing-compartment into which the sewage after having passed through the compartments $A'$ to $A^4$, inclusive, is discharged and from which it is conducted through a plurality of effluent-pipes C. Said effluent-pipes may lead to contact or filter beds, in which the sewage may be subjected to a secondary treatment, or may lead to any other suitable place for the disposal of the effluent. Means are provided for conveying sewage through the tank in such manner as to permit the sewage to flow through only one compartment or through any number of compartments equal to or less than the entire number. Said means are also constructed and arranged in such manner that the compartments may be brought into communication in various combinations, and said compartments are made of varying sizes, whereby each combination produces an effective capacity of the tank differing from either of the other combinations. Means for effecting these results are made as follows: D designates a pipe or conduit which is rotatively mounted at its ends in vertical plates $a^5$ $a^6$, supported on the upper parts of the transverse walls $a$ $a'$ of the tank. Said pipe is provided at its end, which extends into the detritus-compartment $A'$, with two receiving branches $D'$ $D^2$, which are disposed at different angles with respect to a plane passing through the axis of the pipe. $D^3$ $D^4$ designate two branch pipes extending from the horizontal pipe D into the compartment $A^2$ and disposed parallel with the pipe in the detritus-compartment. $D^5$ designates a valve located in the pipe D between the branch pipes $D^3$ $D^4$. When the pipe D is turned or rotated on its axis in the proper direction, the branch pipes $D^2$ $D^3$ $D^4$ are submerged and when rotated in another direction the pipe $D'$ is submerged, while the pipes $D^2$ $D^3$ $D^4$ are raised out of the sewage. E designates a stationary pipe or conduit which is mounted at one end in a vertical plate $a^7$, supported on the upper part of the transverse partition-wall $a'$, and at its other end in the wall $a^2$, said pipe discharging into the distributing-compartment $A^5$. The pipe E is provided near its induction end with a cut-off valve $e$. The space between the plates $a^6$ $a^7$ constitute a diversion-chamber $A^8$, with which the pipes D and E communicate. The compartment $A'$ communicates with the compartment $A^2$ through the branch $D^2$, pipe D, and branch $D^3$. The compartment $A^2$ communicates with the diversion-chamber through the branch $D^4$ and the pipe D. The said diversion-chamber communicates with the compartments $A^3$ $A^4$, respectively, by means of pipes F F', which are rotatively mounted at their induction ends in the plate $a^7$, and the discharge ends of which are turned at an angle to the receiving ends and are adapted to dip into the liquid below the level thereof in said compartments. The discharge ends of said pipes F F' are maintained in their vertical positions under the action of gravity and are adapted to be lifted above the level of their induction ends to prevent the passage of liquid to said tanks $A^3$ $A^4$ or either of them. The compartments $A^3$ $A^4$ are provided with outlet pipes or conduits G G', which have their induction ends submerged in the liquid.

The operation of the apparatus described is as follows: Referring more particularly to Fig. 2, it is assumed that the valve $D^5$ in the conduit D is closed. Sewage entering the detritus-compartment $A'$ passes through the branch pipe $D^2$ and the pipe D and outwardly therefrom through the branch pipe $D^3$ into the compartment $A^2$. From the compartment $A^2$ the sewage passes upwardly through the branch pipe $D^4$ into the pipe D and is discharged into the diversion-chamber $A^8$. As shown in Fig. 1, both pipes F F' are in position to discharge sewage from the diversion-chamber to their respective compartments $A^3$ $A^4$. When, therefore, the pipes are in these positions, the sewage passes from the diversion-chamber into the compartments $A^3$ $A^4$ and from said compartments through the pipes G G' into the distributing-compartment $A^5$ and from thence into the effluent-pipes C. At this time the valve $e$ in the pipe E is closed, so that no sewage passes therethrough. It will be seen, therefore, that when the pipes are in the position described the sewage traverses all of the compartments of the tank, said tank being open to its fullest capacity and arranged to give to the sewage the maximum rest period of the tank. In order to arrange the tank for its minimum rest period, the valve $D^5$ in the pipe D is opened and the pipe or conduit D is turned or rotated on its axis, so as to throw the pipes $D^2$ $D^3$ $D^4$ out of the liquid and submerge the pipe $D'$ therein. At this time the sewage is conveyed directly from the detritus-compartment to the diversion-chamber $A^8$. The outlet-pipes F F' for the diversion-chamber are also thrown upwardly about the axis of the induction ends thereof and the valve $e$ of the pipe E opened. The sewage therefore passes directly from the diversion-chamber to the distributing-compartment $A^5$, and from thence it is discharged through the effluent-pipes C. The rest period given to the liquid in this case is that determined by the capacity of the compartment $A'$ and is the minimum rest period of the tank. Such rest period is suitable for highly-diluted sewage or a sewage having a relatively high temperature. The compartment $A'$ may be brought into communication with the other compartments under various combinations and the capacity of the tank may be widely varied intermediate the minimum and maximum capacity. For instance, the compartment A' may communicate with the compartment A² and the effluent therefrom be passed directly to the distributing-compartment A⁵, or said compartment A' may communicate directly with either of the compartments A³ A⁴ or with both of said compartments and have no communication with the compartment A². Furthermore, the compartment A' may communicate with the compartment A² and said compartment A² may communicate with either of the compartments A³ A⁴ or with both, as desired. By this arrangement I am enabled to secure in the construction shown seven different combinations, affording seven different capacities of the tank to correspond with the rest periods of seven different kinds or characters of sewage.

Next referring to the construction shown in Figs. 3 and 4, H designates a tank having continuous side and end walls and divided by transverse walls $h\ h'$ and a longitudinal wall $h^2$ into four compartments H' H² H³ H⁴. The compartment H' constitutes the detritus or grit compartment and receives the raw sewage through a delivery-pipe I. The sewage flows from the detritus-compartment H' into the compartment H² over the transverse wall $h$. The compartment H² communicates with the compartments H³ H⁴, respectively, by means of stationary conduits or pipes I' I², mounted in the transverse wall $h'$, and said compartments H³ H⁴ respectively communicate with a transverse conduit H⁵, located at the end of the tank, by means of other stationary conduits or pipes I³ I⁴, mounted in the end wall of the tank. Said pipes I' I² I³ I⁴ are provided with cut-off valves $i\ i'\ i^2\ i^3$. With this construction it will be seen that the compartment H² may be brought into communication with either of the compartments H³ H⁴, or with both, as desired, by the proper opening and closing of the valves $i\ i'$. In this manner three combinations may be formed, thereby providing for three different rest periods. It will be understood, of course, that when one of the compartments H³ H⁴ is cut out of the active combination its corresponding outlet-pipes I³ I⁴ are closed.

In Figs. 5 and 6 the capacity of the active portion of the tank is varied by bodily shifting or moving from one side to the other of the tank a movable partition which is arranged longitudinally in the tank. In said figures, J designates a tank provided at one end with an inlet-pipe K and at its other end with an outlet-pipe K', which discharges into a trough J', connected with a pipe leading to a suitable place for the disposal of the sewage. L designates a partition arranged longitudinally of the tank and extending from one end wall thereof to the other. The lower end of said partition is closely adjacent to the bottom wall of the tank. Said partition is laterally shiftable and for this purpose is suspended on a shaft L', which is mounted at its ends in supporting-wheels L², which travel on track-rails $j$ on the upper faces of the end walls of the tank. It will be noted that the inlet and outlet pipes K K' lead to and from the tank, near one side wall thereof, and that said partition L may be moved closely adjacent to the said side wall without disturbing the communication of the compartment formed between said side wall and partition and the inlet and outlet pipes. With this construction when it is desired to increase the effective capacity of the tank J, and thereby increase the rest period of the sewage which passes therethrough, the partition L is moved laterally away from the inlet and outlet pipes the distance required, and when the effective capacity of the tank is to be decreased to produce a shorter rest period for the sewage said partition is moved laterally toward said inlet and outlet pipes. It will be seen by an inspection of Fig. 6 that the line of flow between the inlet and outlet pipes in the tank is always confined to the elastic compartment formed between the partition and the side wall of the tank adjacent to the inlet and outlet pipes and that the elastic compartment on the other side of said partition is filled with sewage in a quiescent state. The active zone of the tank is therefore always on the side of the partition adjacent to the inlet and outlet pipes.

In Figs. 7, 8, and 9 I have shown a construction wherein the available capacity of the tank is varied by elevating and lowering the discharge end of the effluent-pipe. As shown in said drawings, M designates the tank provided at one end with an inlet-pipe N and at its other end with an effluent-pipe N⁴. Located inside the end wall of the tank containing said eduction-pipe is a vertical wall Mᵃ, between which and the adjacent end wall of the tank is formed a chamber or compartment M'. Communication between the main compartment of the tank and the compartment M' is afforded by a revolving pipe N', which is provided with parallel branches N² N³, the former of which is located inside the main compartment of the tank and the latter in the distributing compartment or chamber M'. The inlet-pipe N delivers liquid into the detritus chamber or compartment M², which is located between the end wall of the tank and a vertical partition M³, and said compartment M² communicates with the principal compartment of the tank by overflowing said partition. The revolving outlet-pipe N' is mounted in a plate N⁴, secured or embedded in the end wall of the tank. The branch N² of said outlet-pipe located within the tank is made shorter than the branch N³, the latter branch extending, when in its vertical position, almost to the level of the top of the vertical wall Mᵃ. The upper end of the branch N³ of the outlet-pipe determines the level of the liquid in the tank and the pipe may be held in an adjusted position by any suitable mechanism. When said branch occupies the position shown in Figs. 7 and 9, the tank may be filled to its maximum capacity to provide for its maximum rest period. If it be desired to decrease the capacity of the tank, and therefore the rest period of the sewage which passes therethrough, said outlet-pipe is revolved on its axis so as to swing the discharge end of the branch $N^3$ downwardly, as indicated in dotted lines in Fig. 9.

When using the construction shown in Figs. 5 and 6 or in Figs. 7 and 8, it will be necessary to employ a series of tanks, so that when the tanks are adjusted to give the sewage the maximum rest period, the sewage therefore has a slow movement through the tank, it will be necessary to divert a portion of the sewage into one or more of the other tanks of the series which have been previously idle, so as to thereby enable the series of tanks as a whole to accommodate all the sewage delivered thereto.

In Figs. 10, 11, and 12 I have shown a construction wherein the rest period of the tank or tanks is controlled by varying the supply of sewage thereto. As shown in said figures, O O designate a series of tanks located side by side. P designates an inlet-conduit, which is connected with the several tanks O by means of short lateral branches P' P'. The flow of sewage from the branch pipes P' to the tanks O is controlled by means of vertically-adjustable weir-boards $P^2$, which slide in vertical guides or ways $p$ in the walls of the branches P', as shown in Fig. 11. The said branch passages or conduits P' discharge into pockets O', located at the entrance of the tanks O, which pockets are formed by vertically-curved walls $O^2$, connected with the end walls of the tank and extending to the top thereof. Said walls $O^2$ are provided at their lower ends with openings $o$, as shown in Fig. 11, through which the pockets O' communicate with the tanks. The construction last described is provided in order to discharge the sewage into the tank below the flow-line thereof, and thereby prevent surface-currents which would tend to break the scum which forms on the upper surface of the sewage in the tank. The inlet-conduit P communicates with the several tanks O at successively lower levels from the first to the last tank of the series, the bottom wall of said conduit for this purpose being composed of a plurality of stepped portions $p'$ $p^2$ $p^3$ $p^4$ $p^5$, as indicated in Fig. 12. The conduit P is provided with a plurality of stationary weir-boards $P^3$ $P^4$ $P^5$ $P^6$, located at the offsets between the stepped portions of the bottom of the conduit P, as shown in Fig. 12, the purpose of said stationary weir-boards being to maintain different levels of the sewage in the different parts of the conduit P. With this construction by raising or lowering the movable weir-boards $P^2$ of the branch inlet-passages the flow of the sewage through the tanks may be varied to increase or diminish the rest period of the sewage in the tank, it being obvious that if the weir-boards $P^2$ of the active tank be raised the capacity of said tank will be increased, and therefore the rest period of the sewage in said tank correspondingly increased. By reason of the fact that increase of the rest period in the tank increases the time in which the sewage flows therethrough when said weir-boards are adjusted to increase the rest period of a given tank or tanks (the supply of sewage remaining the same) one or more of the tanks in advance of the previously-active tank of the series will be brought into use, the sewage flowing over the stationary weir-boards in the conduit P and being discharged through the branch passages P' into said tanks next to be brought into use. In this manner the entire volume of sewage will be passed directly to the tanks of the series for treatment, notwithstanding the fact that the initial tank or tanks are adjusted to accommodate less than the entire volume of the sewage. It will be obvious that the same results will be obtained by making the weir-boards $P^2$ stationary and the weir-boards $P^3$ to $P^6$, inclusive, vertically adjustable. Each of said tanks is provided with a stationary outlet-pipe Q, located in the end wall of the tank remote from the inlet branches P', and said outlet-pipes discharge into a trough or conduit $O^3$, located at the ends of the series of tanks and passing longitudinally from one end to the other of the series.

It will be manifest that in the employment of all of the different forms of apparatus hereinbefore described for purifying sewage by septic action the same process will be carried out and the same general result produced— that is to say, in carrying out the process in either of the ways set forth the rates of flow of the sewage through the receptacle or receptacles in which septic action takes place will be so governed or controlled as to correspond with the rest periods required for the different kinds or conditions of the sewage being operated upon or treated, so that while the process is a continuous one the period of time during which the septic action continues may be made to correspond with the varying kinds or volumes of sewage upon which it may be necessary to operate.

I claim as my invention—

1. An improvement in the process of purifying sewage by septic action which consists in varying the quiescent or rest period of a continuously-flowing volume of sewage to correspond with that necessary for properly purifying sewage of different characters.

2. The improvement in the process of purifying sewage by septic action which consists in effecting a continuous flow of the sewage through the unrestricted receptacle in which it is subjected to septic action, and varying the periods during which the sewage is exposed to the septic action in the receptacle in such manner as to produce an approximately uniform effluent, notwithstanding the varying characters of the sewage and varying influencing environments.

3. The improvement in the process of purifying sewage by septic action which consists in continuously delivering the sewage to and discharging it from the unrestricted receptacle or receptacles in which the septic action takes place, and varying the capacity of the receptacle or receptacles to accord with the proper rest or quiescent periods for sewage of varying characters and volumes and with varying influencing environments whereby the sewage is subjected a sufficient length of time to the septic action of the bacteria but not sufficiently long to injuriously affect the bacterial action.

In testimony that I claim the foregoing as my invention I affix my signature, in presence of two witnesses, this 10th day of July, A. D. 1901.

JOHN W. ALVORD.

Witnesses:
WILLIAM L. HALL,
GEORGE R. WILKINS.